(12) United States Patent
Surendran et al.

(10) Patent No.: US 7,765,212 B2
(45) Date of Patent: Jul. 27, 2010

(54) AUTOMATIC ORGANIZATION OF DOCUMENTS THROUGH EMAIL CLUSTERING

(75) Inventors: Arungunram C. Surendran, Sammamish, WA (US); Erin L. Renshaw, Kirkland, WA (US); John C. Platt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 11/321,963

(22) Filed: Dec. 29, 2005

(65) Prior Publication Data

US 2007/0156732 A1 Jul. 5, 2007

(51) Int. Cl.
*G06F 7/00* (2006.01)
*G06F 17/30* (2006.01)
(52) U.S. Cl. .................................... 707/738; 707/739
(58) Field of Classification Search ................ 707/101, 707/3, 737, 738, 739, 999.003, 999.101; 704/245
See application file for complete search history.

(56) References Cited

U.S. PATENT DOCUMENTS

| | | | |
|---|---|---|---|
| 5,963,940 A * | 10/1999 | Liddy et al. ..................... | 707/5 |
| 6,128,613 A * | 10/2000 | Wong et al. ....................... | 1/1 |
| 6,167,368 A * | 12/2000 | Wacholder ..................... | 704/9 |
| 6,253,169 B1 * | 6/2001 | Apte et al. ..................... | 704/9 |
| 6,349,307 B1 * | 2/2002 | Chen ..................... | 707/103 X |
| 6,446,061 B1 * | 9/2002 | Doerre et al. ....................... | 1/1 |
| 6,493,663 B1 * | 12/2002 | Ueda ............................. | 704/9 |
| 6,578,032 B1 * | 6/2003 | Chandrasekar et al. ......... | 707/6 |
| 6,592,627 B1 * | 7/2003 | Agrawal et al. ............. | 715/234 |
| 6,654,743 B1 * | 11/2003 | Hogg et al. ..................... | 707/7 |
| 6,691,108 B2 * | 2/2004 | Li ..................................... | 1/1 |
| 6,871,174 B1 * | 3/2005 | Dolan et al. ................... | 704/9 |
| 7,228,301 B2 * | 6/2007 | Meyerzon et al. .................. | 1/1 |
| 7,565,630 B1 * | 7/2009 | Kamvar et al. ..................... | 1/1 |
| 7,593,932 B2 * | 9/2009 | Lindh et al. ..................... | 707/5 |
| 7,627,590 B2 * | 12/2009 | Boguraev et al. .................. | 1/1 |
| 2002/0023136 A1 * | 2/2002 | Silver et al. ................. | 709/206 |
| 2002/0055936 A1 * | 5/2002 | Cheng et al. ............. | 707/104.1 |
| 2002/0156810 A1 * | 10/2002 | Holland et al. .............. | 707/513 |
| 2003/0182631 A1 * | 9/2003 | Tsochantaridis et al. .... | 715/531 |
| 2003/0220922 A1 * | 11/2003 | Yamamoto et al. ............. | 707/7 |
| 2004/0117736 A1 * | 6/2004 | Newman ..................... | 715/523 |
| 2004/0177048 A1 * | 9/2004 | Klug .......................... | 705/401 |
| 2004/0177319 A1 * | 9/2004 | Horn ....................... | 715/501.1 |

(Continued)

OTHER PUBLICATIONS

Tzoukermann et al., GIST-IT: summarizing email using linguistic knowledge and machine learning,Annual Meeting of the ACL Proceedings of the workshop on Human Language Technology and Knowledge Management—vol. 2001; Toulouse, France pp. 1-8,Year of Publication: 2001, Association for Computational Linguistics.*

(Continued)

*Primary Examiner*—James Trujillo
*Assistant Examiner*—Jorge A Casanova
(74) *Attorney, Agent, or Firm*—Lee & Hayes, PLLC

(57) ABSTRACT

A system that facilitates organization of emails comprises a clustering component that clusters a plurality of emails and creates topics for emails by assigning key phrases extracted from emails within one or more clusters. An organization component then utilizes the key phrases to organize documents. Furthermore, the organization component can comprise a probability component that determines a probability that a document belongs to a certain topic.

20 Claims, 12 Drawing Sheets

U.S. PATENT DOCUMENTS

2004/0243388 A1* 12/2004 Corman et al. .................. 704/1
2006/0085504 A1* 4/2006 Yang et al. .................. 709/206
2006/0095521 A1* 5/2006 Patinkin ..................... 709/206

OTHER PUBLICATIONS

Olle Balter, et al. Bifrost Inbox Organizer: Giving users control over the inbox. NAD A T echn ica I Repo r t TRITA-NA-p. 010 1. Ro yal. Oct. 2002.

Victoria Bellotti, et al. Taking Email to Task: The Design and Evaluation of a Task MAnagement Centered Email Tool. Pr o ceed ing s of th e Con fer ence on Hum an Fa ctor s in Computing Systems (CHI-2003). 2003.

Gary Boone. Concept Features in Re: Agent, an Intelligent Email Agent. Second International Conference on Autonomous Agents. May 10-13, 1998.

Douglass R. Cutting, et al. Scatter/Gather: A Cluster-based Approach to Browsing Large Document Collections. SIGIR 92, pp. 318-329, 1992.

Paul Dourish et al. Presto: An Experimental Architecture for Fluid Interactive Document Spaces. ACM Transactions on Computer-Human Interaction, 1999.

Thomas Hofmann. Probabilistic Latent Semantic Indexing. Machine Learning. 2001.

Yifen Huang, et al. Inferring Ongoing Activities of Workstation Users by Clustering Email. Conference on Email and Anti-Spam. 2004.

Wendy E. Mackay. More Than Just a Communication System: Diversity in the Use of Electronic Mail. Proceedings of the CSCW 1998 Conference on Computer Supported Co-operative Work. 1988.

Andrew McCallum, et al. A Comparison of Event Models for Naive Bayes Text Classification. AAAI-98 Workshop on Text Categorization. 1998.

Kenrick Mock. An Experimental Framework for Email Categorization and Management. SIGIR. 2001.

Richard B. Segal, et al. MailCat: An Intelligent Assistant for Organizing E-Mail. In Proceedings of the 3rd International Conference on Autonomous Agents. 1999.

Gina D. Venolia, et al. Supporting Email Workflow. Microsoft Technical Report. 2001.

Steve Whittaker, et al. Email overload: exploring personal information management of email. Proceedings of the ACM Conference on Human Factors in Computing Systems. 1996.

Endong Xun. A Unified Statistical Model for the Identification of English BaseNP. ACL-2000, The 38th Annual Meeting of the Association for Computational Linguistics, Hong Kong. Oct. 2000.

* cited by examiner

FIG. 10

Document Browser Demo

File  Action  Options

Keyword List | puzzles and logic problems

| | | Author | Title | Date ▲ | Rank |
|---|---|---|---|---|---|
| ⊞ acoustic echo cancellation (821) | | | | | |
| ⊞ ieee (538) | ☒ | Krishna Nair | Logic Proble... | 10/14/2003 6:46... | ||||| |
| ⊞ ieee transactions papers (941) | ☒ | Vadim Meleshuk | Logic Problem... | 10/14/2003 7:09... | ||||| |
| ⊞ interview candidates (190) | ☒ | Krishna Nair | Logic Problem... | 10/14/2003 7:33... | ||||| |
| ⊞ keywords (535) | ☒ | Vadim Meleshuk | Logic Problem... | 10/15/2003 4:53... | ||||| |
| ⊞ knowledge tools research (74) | ☒ | Ruslan Ovechkin | Logic Problem... | 10/16/2003 7:20... | ||||| |
| ⊞ msn search (113) | ☒ | Krishna Nair | Logic Problem... | 10/16/2003 7:32... | ||||| |
| ⊞ noise suppression (265) | ☒ | Vadim Meleshuk | Logic Problem... | 10/16/2003 7:32... | ||||| |
| ⊞ paper review (1019) | | | | | |
| ⊞ puzzle hunt (109) | ☒ | John Larcheveque | Logic Problem... | 11/21/2003 12:3... | ||||| |
| ⊞ puzzles and logic problems (142) | ☒ | Dmitri Davydok | Logic Problem... | 11/21/2003 12:4... | ||||| |
| ⊞ tablet pc purchase (577) | ☒ | Vadim Meleshuk | Logic Problem... | 11/21/2003 6:03... | ||||| |
| ⊞ techfest demo (328) | | | | | |
| ⊞ yahoo photos (301) | ☒ | Mike Moroney | Puzlog Classi... | 12/8/2003 8:54 PM | ||||| |
| | ☒ | Peiyush Jain | Grid Lock | 2/20/2004 11:56... | ||||| |
| | ☒ | Blake Manders | Grid Lock | 2/21/2004 2:31 AM | ||||| |
| 1004 | ☒ | Arun Surendran | Grid Lock | 2/23/2004 2:32 AM | ||||| |
| | ☒ | Arun Surendran | Grid Lock | 2/23/2004 2:50 AM | ||||| |
| | ☒ | Peiyush Jain | Oil pipeline re... | 2/25/2004 8:06 PM | ||||| |

I thought I would begin with a nice logic question a friend asked me (there are multiple solutions, and I am unsure if mine is optimal):

There are 100 convicts sentenced to be locked up in individual cells for life. Everyday the warden randomly picks one prisoner and takes him to a common hall for prayers etc. There is an ordinary table lamp in this room. By the rules of the prison, if a prisoner can DECLARE to the warden that ALL 100 prisoners have been to the room atleast once, then they are all set free. If somebody does make this declaration but it is incrrect, then they are all executed. The prisoners have no means of coomunication between them.

Before they are taken to the cells, the 100 convicts conspire for a strategy by which one person can ASCERTAIN the declaration (there cannot be any chance of it being incorrect however small). The question is what would be the expected no: of days before this declaration can be made. if all the prisoners have equal probability of being led to the hall on any day?

1008

(Hint: Use the table lamp as a single bit mode of communication)

AUTOMATIC ORGANIZATION OF DOCUMENTS THROUGH EMAIL CLUSTERING

BACKGROUND

Storage capacity on computing devices has increased tremendously over a relatively short period of time, thereby enabling users and businesses to create and store a substantial amount of data. For example, hard drive space on today's consumer computers is in the order of hundreds of gigabytes. Servers and other higher-level devices can be associated with a significantly greater amount of storage space. This growth in storage capacity is not solely limited to personal computers and servers, but rather has reached into the portable device space, such as portable telephones, personal digital assistants, portable media players, and other suitable hand-held devices.

The massive amount of storage space available to average consumers has enabled them to retain thousands if not millions of files. For example, photographs can be taken through use of a digital camera and then transferred and retained on a computing device. Thus, a computing device can effectively be utilized as a photograph album. In a similar vein, music files can be ripped from a media such as a compact disk and placed upon the computing device, thereby enabling the computing device to act as a juke box. Word processing documents can be created and retained, wherein such documents can relate to one's bills, reports, school papers, employment, investment portfolio, etc. Spread sheet files, slide presentations, and other item types relating to any topic desired by the user can also be created and/or retained in a hard disk or memory of a computing device. Given the significant number of data files that may exist on a computing device, wherein such files can be created at different times and relate to different topics, it can be discerned that organization and/or indexing of such files can be extremely problematic.

To undertake data file organization, conventionally folders and sub-folders are created, wherein names and location within a hierarchy of the folders is determined according to topic and content that is to be retained therein. This can be done manually and/or automatically; for instance, a user can manually create a folder, name the folder, and place the folder in a desired location. Thereafter, the user can move data/files to such folder and/or cause newly created data/files to be saved in the folder. Folders can also be created automatically through one or more programs. For example, digital cameras typically store files in folders that are named by date—thus, digital photographs can be stored in a folder that recites a date that photographs therein were taken. This approach works well for a small number of files created over a relatively short time frame, as users can remember locations of folders and contents that were stored therein. When number of files and folders increases and time passes, however, users have difficulty remembering where items that they wish to retrieve are located, what they were named, etc. A search for file content or name can then be employed, but often this search is deficient in locating desired data, as a user may not remember a name of a file, when such file was created, and other parameters that can be searched. To cause even further difficulty, a file may be related to a particular topic, but a search function cannot be employed due to lack of content or lack of particular wording.

A similar problem exists with respect to emails, as users can retain hundreds if not thousands of emails. Currently, organizing such emails requires a significant amount of labeling by a user. For instance, a user can categorize emails from a particular sender as "junk" email, thus causing each email delivered from such sender to be provided to a certain folder. Similarly, users can manually create folders and drag emails into such folders to organize emails. Furthermore, an email application can be trained to automatically direct emails to a particular older. However, emails that may belong to more than one folder that are assigned to a single folder can leave other folders incomplete. Additionally, items moved outside of an inbox are typically ignored.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates generally to document organization, and more particularly to automatic document organization through automatic discovery of topics of interest of a user from their email. To effectuate this automatic organization of documents, emails associated with a user can be received and clustered by way of any suitable clustering algorithm(s). For example, the clustering can be undertaken such that an email can reside within a single cluster, or the clustering can be undertaken such that an email can reside within multiple clusters. The emails can be received from a web-based email service and/or an email application resident upon a client. Thus, all emails associated with a particular user can be analyzed and employed in connection with automatic organization of documents. In one particular example, multi-level clustering can be undertaken against the received emails, wherein multi-level clustering refers to undertaking several clustering acts against the received emails.

Upon the emails being placed into one or more clusters, key phrases can be extracted from multiple emails within the clusters. These extracted key phrases can be representative of a topic of personal interest to the user, and documents can be assigned to such topics. Documents that can be assigned to topics include emails, word processing documents, spreadsheets, digital images, video files, audio files, and any other suitable type of electronic file. Extracting key phrases from clustered emails is advantageous in that users often communicate over email with respect to areas of personal relevance to the user. Thus, topics that are highly relevant to the user can be automatically generated and utilized to organize emails as well as other documents.

To ensure that extracted key phrases are personalized with respect to the user, various filtering mechanisms can be employed to remove terms that are too general and/or not typically related to personalized topics. For example, a candidate list of key phrases can be reduced to noun phrases in subject lines of emails. Similarly, dates, days of the week, and the like can be removed as candidates for key phrases that characterize a particular topic. Still further, names of recipients and senders of emails can be collected and employed to refine key phrases extracted from clusters of documents.

Upon determining topics of interest to a user, any suitable document can be assigned to one or more topics that are characterized by the key phrases. For example, text associated with a document can be analyzed to determine a measure of relevance between the document and a particular topic. If the measure of relevance is above a threshold, the document can be assigned to the topic. Furthermore, it is understood that documents can be assigned to multiple topics. A user interface can be employed by a user to quickly access documents according to topic. For example, upon selection of a particular topic, documents associated with such topic can be provided to the user.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

BRIEF DESCRIPTION OF THE DRAWINGS

FIG. 10 is a screenshot of an exemplary user interface.

DETAILED DESCRIPTION

Figure 1:
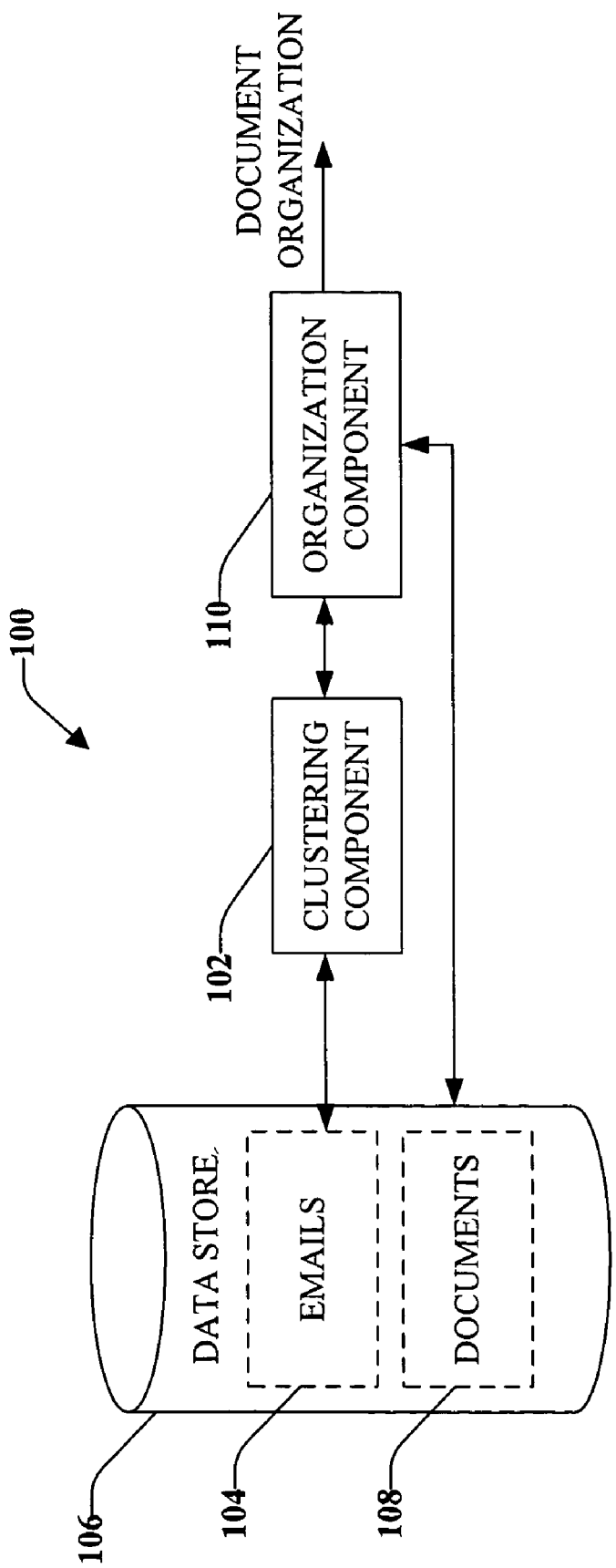
FIG. 1 is a high-level block diagram of a system that facilitates automatic organization of documents through clustering multiple emails.

The subject invention is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

The claimed subject matter will now be described with respect to the drawings, where like reference numerals refer to like elements throughout. The claimed subject matter relates to automatically discovering topics of interest associated with a user by reviewing email data of such user. These topics of interest can then be employed to automatically organize items (including emails) associated with a user. Further, the systems, methods, articles of manufacture, and/or apparatuses described herein can be considered as being unsupervised and automatic, meaning that a pre-existing folder structure is not necessary to determine topics and organize items based at least in part upon the determined topics. Thus, an entire document store can be arranged into topics that are meaningful to the user.

To that end, FIG. 1 illustrates a document organization system 100. The system 100 includes a clustering component 102 that receives a plurality of emails 104 from a data store 106. The data store 106 can also include several documents 108, such as word processing documents, web pages, spreadsheet files, digital images, or any other suitable type of electronic file. Furthermore, the emails 104 and the documents 108 are illustrated separately for ease of explanation, as the term "documents" is intended to encompass emails. Additionally, while a single data store 106 is shown as retaining the emails 104 and the documents 108, it is understood that the data store 106 can be a distributed data store. Thus, a first portion of emails received by the clustering component 102 can be existent on a first data storage device while a second portion of emails received by the clustering component 102 can be existent on a second storage device. Moreover, the emails 104 can be associated with different email applications. For example, a first portion of the emails can be associated with a web-based email account while a second portion of the emails can be associated with an email application installed upon a computer.

Content of the emails 104 received by the clustering component 102 can be employed to discover topics that are of importance to an individual associated with the emails 104. For example, an individual's personal interests can be gleaned through analyzing content of their emails. As utilized herein, a topic can be defined as any cohesive concept that is relevant to a user, such as an activity in which the user participates, an event the user organized or attended, a person or group of people within an organization to which the user belongs, etc. Furthermore, groups of people can sometimes be defined by concepts that appear in the emails 104, such as a project, a person, an activity, a mailing group, and the like. In another example, a group of people can be defined by information not within the emails 104, such as a circle of friends that do not utilize the term "friends" in email to refer to one another. Most commonly, a topic is signaled by occurrence of words relating to a common activity. The clustering component 102 can be thought of as a mechanism for deriving topics. Upon receipt of the emails 104, the clustering component 102 can cluster the plurality of emails 104 into a plurality of disparate clusters. For example, the clustering can be undertaken such that an email can be assigned to several clusters. Alternatively, the clustering component 102 can cluster the emails 104 such that an email may only be assigned to a single cluster.

In more detail, the clustering component 102 can employ any suitable clustering algorithm(s) to effectuate clustering of the emails 104. For example, to minimize variations that may be associated with clustering, a multi-level clustering scheme can be employed (where different clustering actions can be performed in a certain sequence). For instance, the emails 104 can be represented using tf-idf (term frequency-inverse document frequency) vectors of particular words within the emails 104, and a cosine distance measure can be employed to measure similarity between different emails. Clusters can then be initialized through employment of agglomerative clustering on a small sample of the emails 104. Thereafter, K-means can be run utilizing the initializations on each of the emails 104 within the data store 108. Probabilistic Latent Semantic Analysis can then be run utilizing the K-means clusters as initial clusters. During each clustering stage clusters that are not associated with a threshold number of threshold percentage of the emails 104 can be removed from further consideration, as providing too many topics will not aid a user in organizing emails and/or documents. It is understood that while examples of clustering acts have been described above, any suitable clustering algorithm can be employed in connection with clustering the emails 104. For example, a mixture of multinomials and hierarchical agglomerative clustering can be employed. Further, Probabilistic Latent Semantic Analysis can be run with random initialization.

To characterize a topic, multi-document key phrase extraction can be employed to extract one or more key phrases from emails within each cluster. In more detail, a select number of characteristic keywords and/or key phrases of a topic can be extracted from each cluster. An advantage of employing Probabilistic Latent Semantic Analysis for clustering is that each cluster is automatically characterized by distribution of words in such cluster. Multi-document key phrase extraction is described in greater detail below.

Upon determining a select number of topics and labeling such topics, an organization component 110 can be employed to organize the emails 104 and the documents 108 through employment of the key phrases that characterize the topics. For instance, a word processing document can be associated with a particular topic by comparing content of such document with key phrases extracted from one or more clusters. Metadata can be assigned to each of the documents 108 to indicate topic(s) to which each of the documents belongs. For instance, each document can be associated with a relevance measure to various topics, and can be assigned to topics where the relevance measure is above a pre-defined threshold. In a detailed example, the relevance measure may be a sum of tf-idf counts of all keywords/key phrases in a particular document. Other relevance measuring techniques, however, are contemplated and intended to fall under the scope of the hereto-appended claims. The organization component 110 can analyze such relevance scores and assign each document within the data store 106 to one or more topics. Furthermore, a user can define a subset of the documents that are to be assigned to topics. For instance, the user may wish that word processing and spreadsheet documents be automatically associated with topics while not wishing to associate digital photographs with topics.

Figure 2:
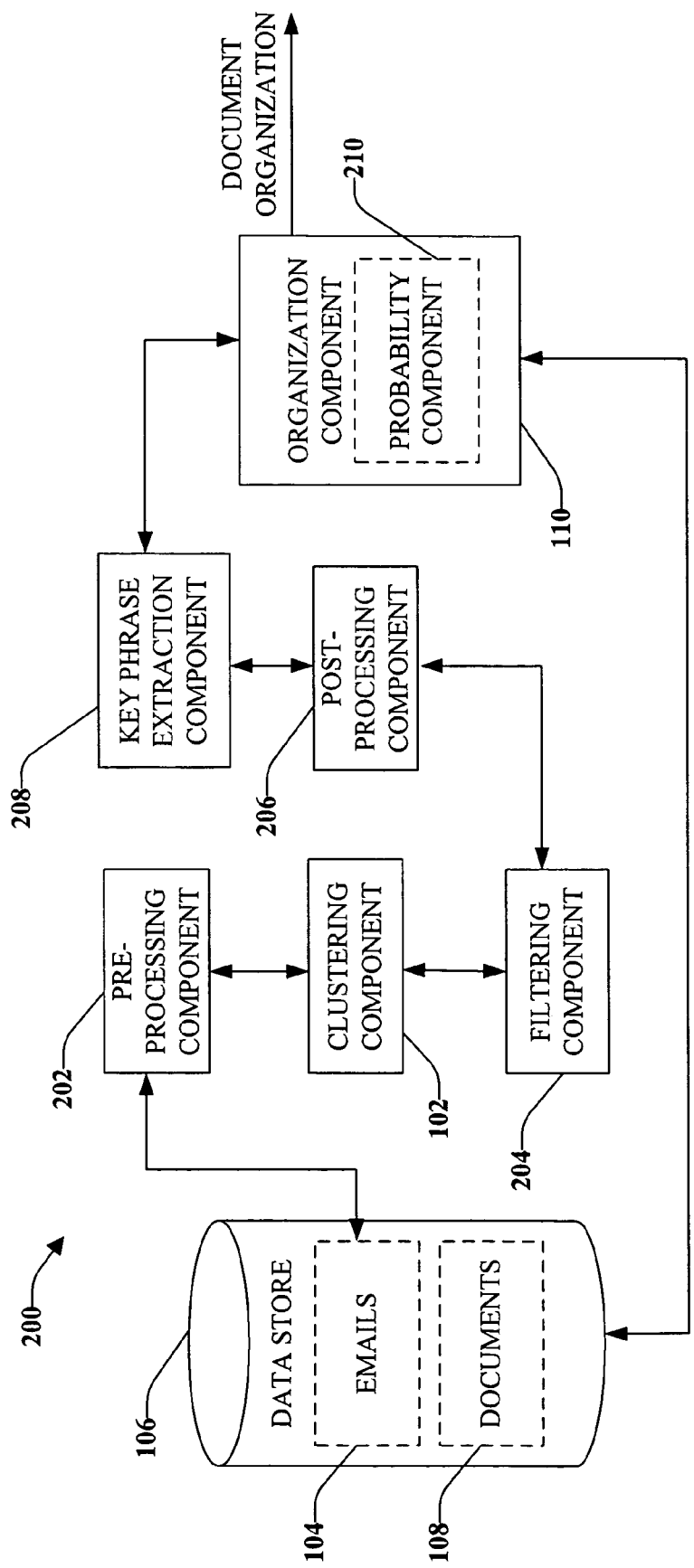
FIG. 2 is a block diagram of a system that facilitates extracting key phrases from multiple emails within clusters of emails.

Turning now to FIG. 2, an automatic document organization system 200 is illustrated. The system 200 includes the clustering component 102 that receives the emails 104 from the data store 106 and generates a plurality of clusters of emails. The system 200 can further include a pre-processing component 202 that can analyze the emails 104 prior to performance of the clustering to aid in determining key phrases that are utilized to characterize one or more topics. For example, the pre-processing component 202 can be associated with a list of stop words that are too general to describe the topic, and the pre-processing component 202 can remove or downweight key phrases that are among the listed stop words. As stated above, this removal or downweight of words can occur before clustering of the emails 104, and the clustering component 102 can provide less weight to certain words when performing clustering and/or ignore certain words when clustering.

The system 200 can further include a filtering component 204 that removes a cluster if a number of emails within such cluster are below a predefined threshold and/or a predefined percentage of total number of emails. For instance, if the clustering component 102 utilizes a multi-level clustering scheme when clustering the emails 104, clusters that do not meet certain criteria at separate clustering steps can be removed. In a detailed example, after agglomerative clustering and running K-means, clusters that do not include a threshold percentage of the emails 104 can be removed. Similarly, after performing Probabilistic Latent Semantic Analysis topics (characterized by particular key phrases) that do not exceed a certain threshold (e.g., 0.1) can be removed from consideration. The system 200 can also include a post-processing component 206 that can remove domain-dependent words, wherein such words may not be meaningful in connection with representing a topic. For example, a name of a department within which an individual is assigned may appear within a multitude of emails, and thus may not be representative of a topic.

After pre-processing, post-processing, and/or filtering associated with the clustering component 102, key phrase extraction can be completed by a key phrase extraction component 208. The key phrase extraction component 208 can extract key phrases from multiple emails that exist within particular clusters. As stated above, one advantage of performing Probabilistic Latent Semantic Analysis is that automatic characterization of topics can be completed based upon distribution of words in such topics. For instance, words can be selected as key phrases if they are within a threshold number (e.g., half) of the probability of a most likely word associated with the cluster. This can limit a number of key phrases that characterize topics to a reasonable number. Additionally, words can be extracted as additional keywords that lie between threshold values (e.g., one half and one fifth) of the word most likely to be associated with the topic. Further, words that are sub-phrases of selected key phrases can be removed from a list of key phrases associated with a topic. For instance, if the phrase "puzzles and logic" is associated with a topic, then the phrase "puzzles" can be removed. Moreover, words that are associated with an individual's name can be prohibited from characterizing a topic unless they are the only words that can characterize the topic.

Identification of the topics characterized by key phrases can be provided to the organization component 110, which can analyze the documents 108 and automatically organize such documents based at least in part upon the key phrases. For instance, the organization component 110 can evaluate text associated with the documents 108 in light of key phrases that characterize/identify a topic. To that end, the organization component 110 can include a probability component 210 that determines a probability that a document belongs to a specific topic. This probability can be determined, for instance, by discerning a number of instances of the key phrases within the document. Any suitable manner for determining a relevance score between a document and a topic, however, is contemplated and intended to fall under the scope of the hereto-appended claims. If the determined probability is above a threshold, the document can be assigned to the topic. Furthermore, a document can reside within multiple topics. For example, the document can be associated with a probability above a threshold with respect to multiple topics, and can be organized accordingly.

Figure 3:
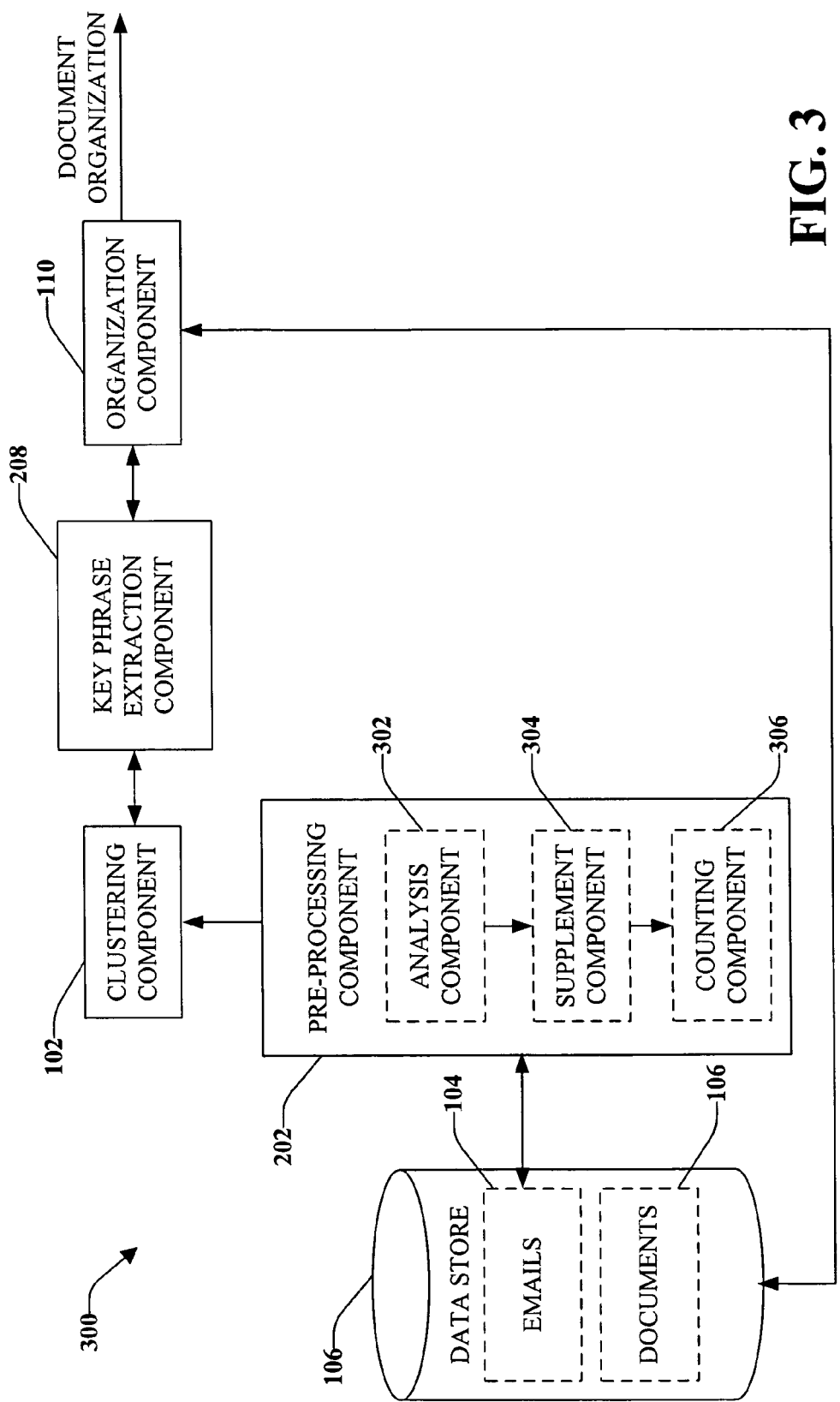
FIG. 3 is a block diagram of a system that facilitates reducing a candidate list of key phrases.

Referring now to FIG. 3, a system 300 for automatically organizing documents is illustrated. The system 300 includes the pre-processing component 202 that processes emails prior to the being provided to the clustering component 202. The pre-processing component 202 can include components that are employed to generate desirable clusters. In more detail, the pre-processing component 202 can include an analysis component 302 that reviews subject line text of the emails 104 and creates a list of noun phrases existent within the subject line of such emails 104. Noun phrases can refer to nouns as well as adjectives that describe such nouns. Any suitable manner for determining noun phrases, however, is contemplated. A supplement component 304 can then be employed to supplement the list of noun phrases with a set of words that appear in any of such phrases. A counting component 306 can thereafter count each occurrence of the supplemented noun phrases in a body of an email. If a number of occurrences is above a pre-defined threshold, the noun phrases can be considered as candidates for key phrases that characterize a particular topic. Clustering by the clustering component 102 can then be undertaken with emphasis upon such noun phrases. Thus, the clustering component 102 can receive processed the emails and cluster such emails into a plurality of different clusters. As described above, the clusters can be generated in such a manner that emails can reside in multiple clusters. The clusters can then be provided to the key phrase extraction component 208, which extracts key phrases that are characteristic of a personalized topic. The key phrase extraction component 208 can operate as described supra. As alluded to above, however, it is undesirable to have a large number of key phrases associated with a topic.

Upon the key phrase extraction component 208 characterizing topics (clusters) with key phrases, such topics can be relayed to the organization component 110. The organization component 110 can access the documents 108 within the data store 106 and organize such documents 108 based at least in part upon the key phrases. As described above, each of the documents 108 can be analyzed in light of the key phrases.

Figure 4:
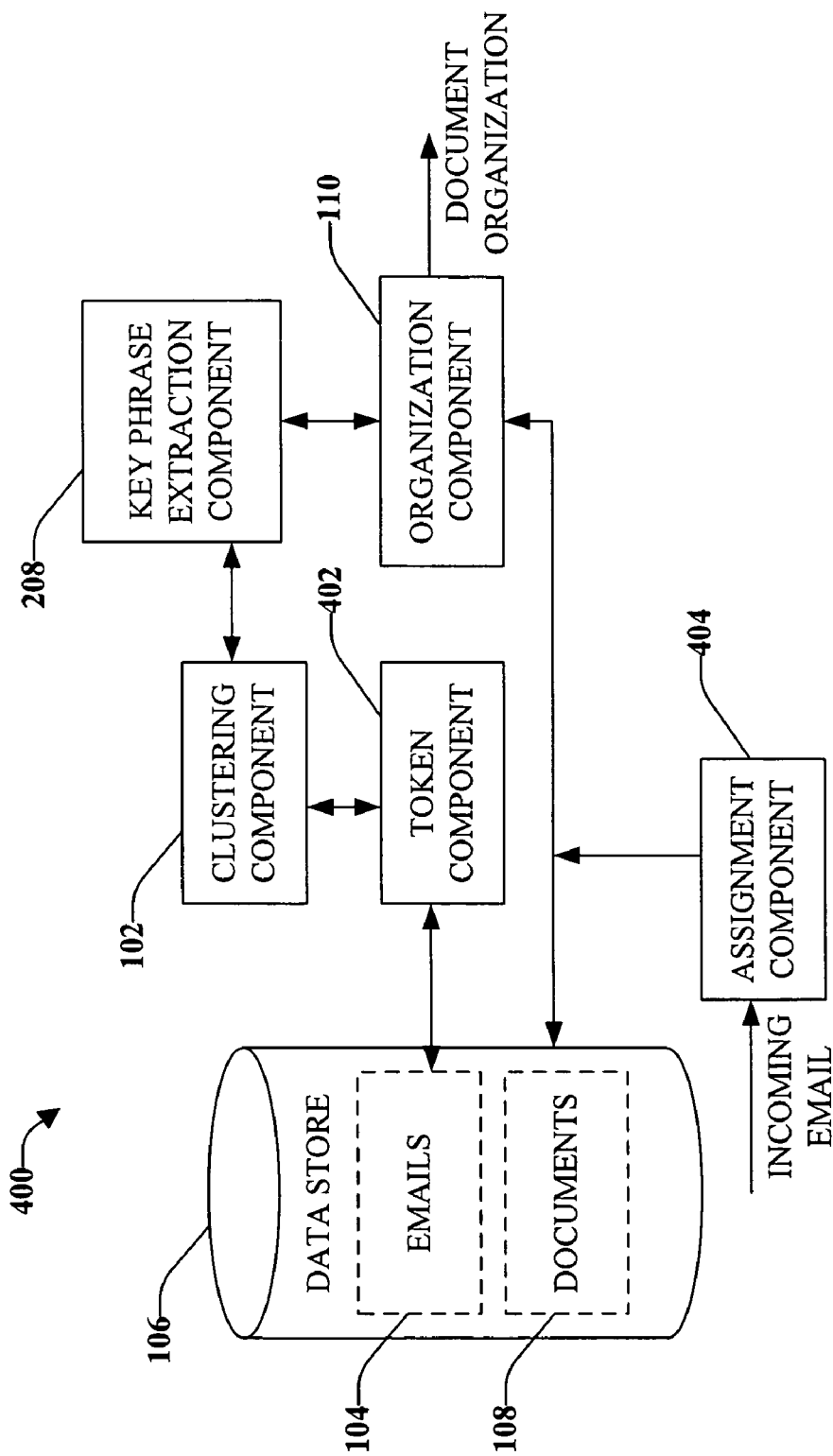
FIG. 4 is a block diagram of a system that facilitates assigning a newly received email to an automatically generated topic.

Referring now to FIG. 4, a system 400 for automatically organizing documents is illustrated. The system 400 includes a token component 402, which receives the emails 104 from the data store 106. The token component 102 can be employed to extract information relating to whom an email was delivered (e.g., individuals in a "Cc" field, individuals in a "To" field, individuals in a "Bcc" field, . . . ) in connection with refining a clustering undertaken by the clustering component 102. For instance, the token component 402 can add tokens to each email corresponding to whom the email was from and to. Thus, email to Individual would be associated, for example, with a token of person_Individual. The tokens provided by the token component 402 can be utilized to refine a topic based upon individuals associated with such topic and/or to aid in separating topics that can share similar words but involve different individuals. The clustering component 102 can then consider such information when clustering the emails 104. Clusters created by the clustering component 102 can be provided to the key phrase extraction component 208, which extracts key phrases from multiple documents within a cluster and characterizes a personalized topic through utilization of a subset of extracted key phrases. The topics and key phrases can then be provided to the organization component 110, which can receive the documents 108 and automatically organize such documents 108.

The system 400 can additionally include an assignment component 404 that is employed to assign an incoming email to a particular topic. For example, it may not be desirable to perform clustering each time an email is received by an email application. The assignment component 404 can assign the incoming email to at least one topic based at least in part upon a calculated probability of relevance (e.g., relevance measure) with respect to the at least one topic. Thus, the assignment component 404 and the organization component 110 can communicate with one another to complete the assignment. Determining a relevance measure with respect to documents has been described above.

Figure 5:
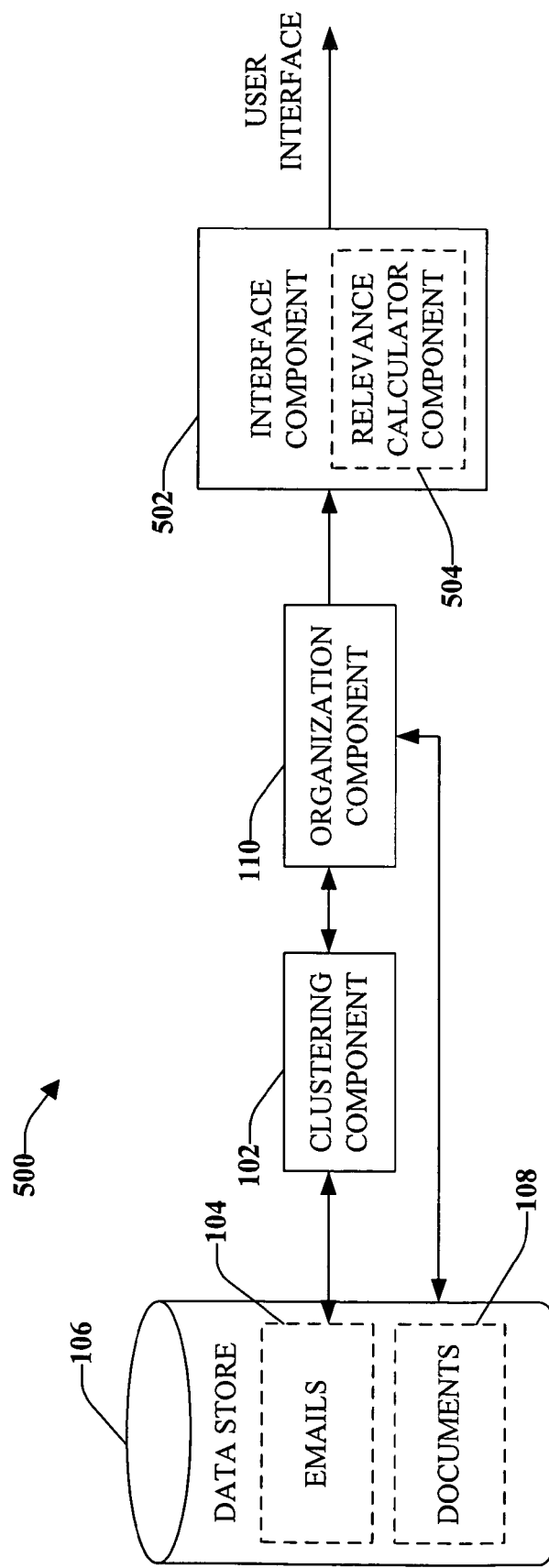
FIG. 5 is a block diagram of a system that facilitates display of organized documents to a user.

Referring now to FIG. 5, a system 500 for automatically organizing documents and presenting such organization to a user is illustrated. The system 500 includes the clustering component 102 that receives the emails 104 and clusters such emails 104. The clustering component 102 can be initiated periodically, upon initiating an email application, upon receipt of user commands, or the like. Performing different clustering over time enables topics to be updated as interests of the user change. Key phrases can be extracted from emails within the clusters and utilized to characterize topics gleaned from the emails. The organization component 110 can then organize the documents 108 based at least in part upon the extracted key phrases.

The organization component 110 can be associated with an interface component 502 that automatically arranges topics defined by the clustering component 102 and presents such topics (and documents associated with such topics) to the user. For instance, the topics can be arranged by the interface component 502 in alphabetical order, according to a number of emails associated with the topics, or any other suitable manner for organizing the topics. Documents associated with the topics can similarly be arranged alphabetically according to title (or subject line), arranged according to sender of an email message, or any suitable manner of arranging the documents with respect to a topic. In one example, the interface component 502 can comprise a relevance calculator component 504 that calculates a relevance measure of an email with respect to a topic that includes the email. The relevance calculator component 504 can use standard relevance formulae in the ranking of the documents. For example, the documents can be ranked by the dot product of the tf-idf vector of each document with the tf-idf vector of the key phrases extracted for that topic. Other relevance formulae, such as BM25, can also be used. The interface component 502 can then display the documents associated with topics according to the calculated relevance. Thus, documents with a highest relevance score with respect to a topic can be displayed most prominently upon a user selecting the topic.

Figure 6:
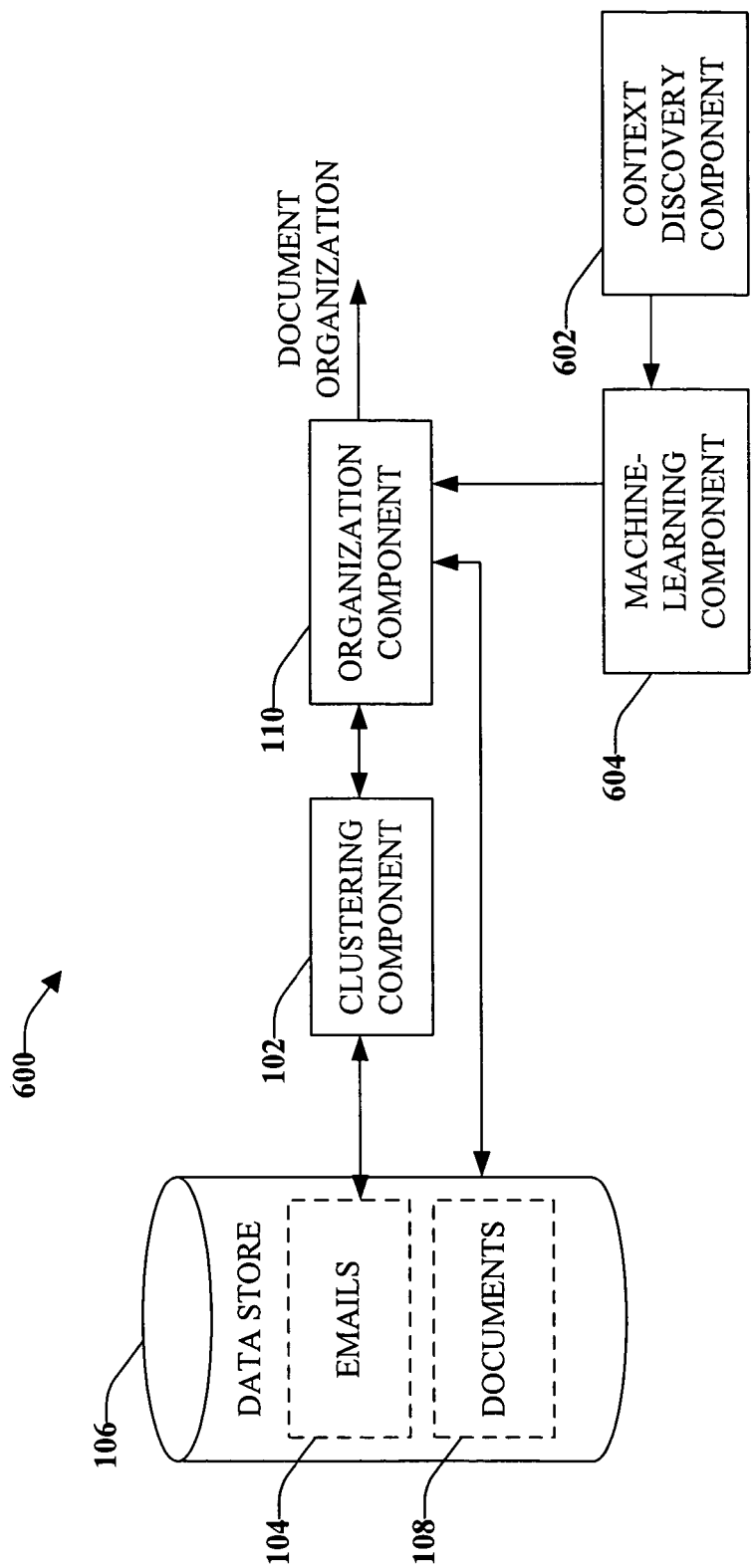
FIG. 6 is a block diagram of a system that facilitates organizing documents based at least in part upon current and/or historical contexts.

Now referring to FIG. 6, an automatic document organization system 600 is illustrated. The system 600 includes the clustering component 102 that receives and clusters the emails 104 and the organization component 110 that can organize the documents 108 based upon key phrases extracted from the clusters. The system 600 can further include a context discovery component 602, which can determine a context associated with a user. For instance, documents may be organized differently when given different contexts. In a particular example, the context discovery component 602 can determine a time of day, day of week, weather conditions, and other contextual data that may affect how a user wishes to have the documents 108 organized. Similarly, the context discovery component 602 can determine current and historical computing contexts associated with the user. For example, the context discovery component 602 can analyze a search engine log associated with the user to review queries provided to a search engine. Similarly, the context discovery component 602 can analyze user history associated with a browser. Such information can aid in determining topics that are currently of most interest to a user.

The user context discovered by the context discovery component 602 can be provided to a machine-learning component 604, which can make inferences based upon current and historical contexts and provide the organization component 110 with instructions based at least in part upon the inferences. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, . . . ) can be employed in connection with performing automatic and/or inferred action. In a particular example, the machine-learning component 604 can determine that during a lunch break the user reviews information relating to a certain sports team. Such determination can be made based upon current and previous contexts provided by the context discovery component 602. Thereafter, the machine-learning component 604 can infer with a threshold probability of correctness that the user desires a certain topic to be prominently displayed.

Figure 7:
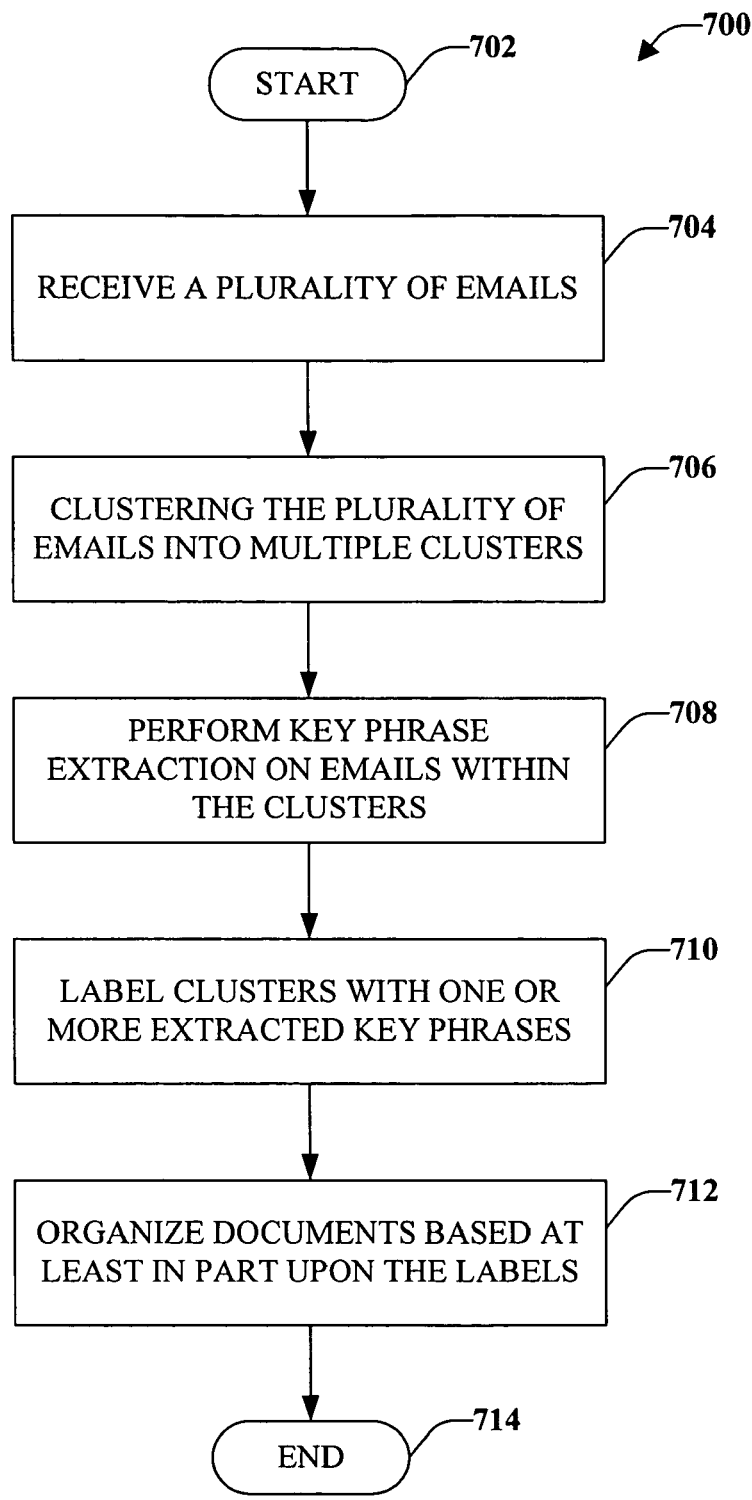
FIG. 7 is a representative flow diagram illustrating a methodology for organizing items based at least in part upon key phrases extracted from emails within clusters of emails.
Figure 8:
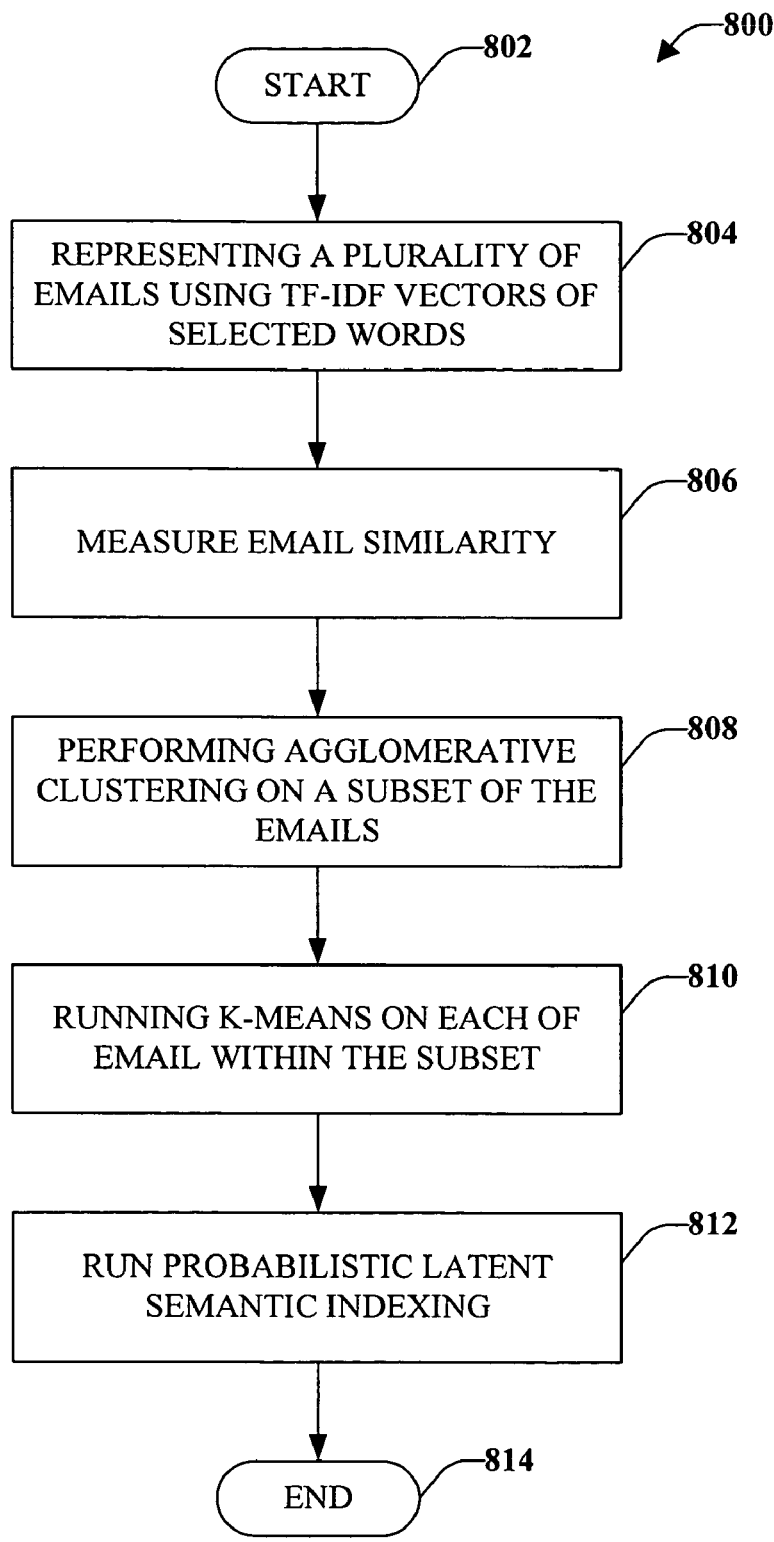
FIG. 8 is a representative flow diagram illustrating a methodology for clustering a plurality of emails.
Figure 9:
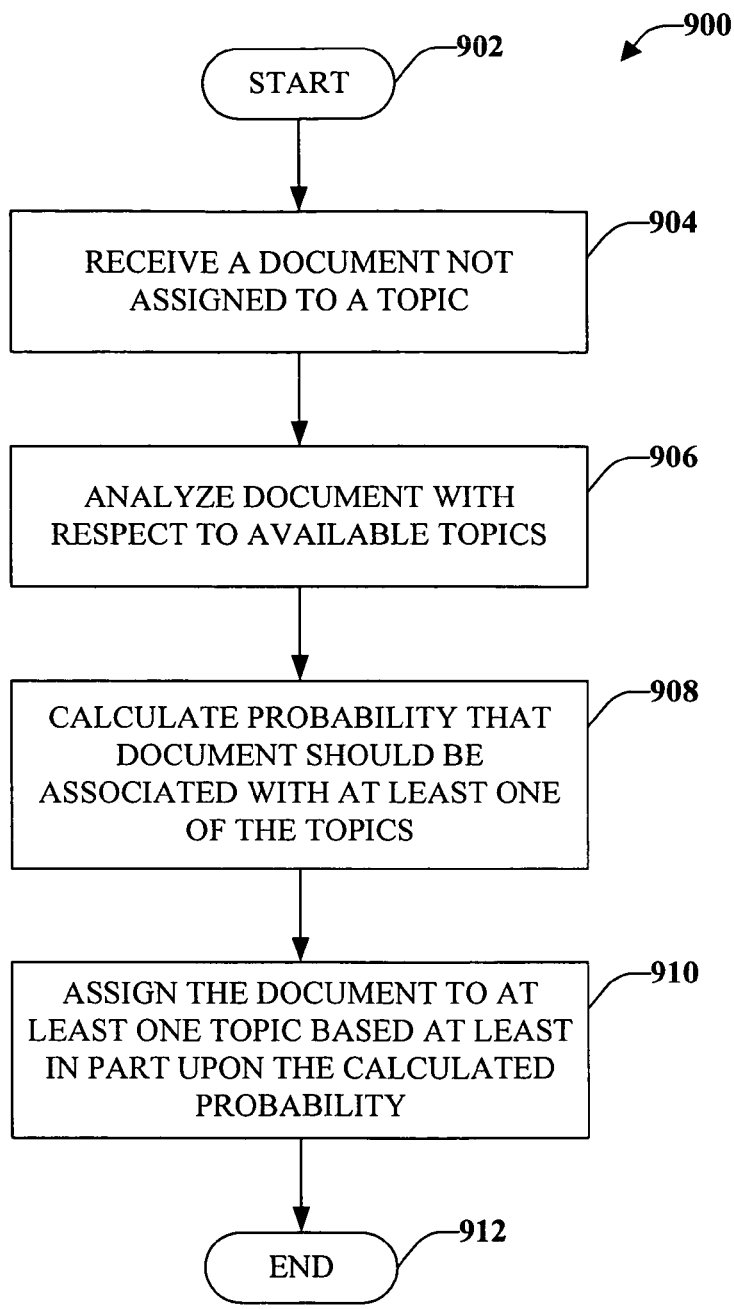
FIG. 9 is a representative flow diagram illustrating a methodology for providing assigning a recently received document to an automatically generated topic.

Referring now to FIGS. 7-9, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 7, a methodology 700 for organizing documents is illustrated. The methodology 700 initiates at 702, and at 704 a plurality of emails are received. The emails can be received from a web-based account, a server associated with an intranet, and/or any other suitable location. At 706, the plurality of emails are clustered into multiple clusters. For example, a multi-tiered clustering approach can be employed, wherein separate clustering acts are performed in sequence. For instance, documents (including emails) can be represented using tf-idf vectors of particular words. Thereafter a cosine distance measure can be employed to measure similarity at least among emails. Clusters can be initialized through agglomerative clustering on a sample of the emails, and K-means can be run using such initializations on all emails. Thereafter, Probabilistic Latent Semantic Analysis can be run using the K-means clusters as initial clusters.

At 708, key phrase extraction can be performed on multiple emails within the clusters. Before or after clustering, a candidate number of possible key phrases can be reduced through various filtering mechanisms. For example, candidate key phrases can be limited to noun phrases that occur within subject lines of one or more emails and are associated with a sufficient number of repetition within bodies of emails. Similarly, dates, days of a week, and the like can be filtered from a list of possible key phrases. At 710, each cluster is labeled with one or more extracted key phrases. These extracted key phrases can then be employed to characterize a topic. At 712, documents are organized based at least in part upon the labels. In one particular example, the key phrases can be compared with content of each document. More specifically, a relevance ranking can be calculated, wherein such ranking is based upon a sum of tf-dif counts of all keywords in a particular document. If the relevance ranking is above a threshold with respect to a particular topic, the document can be assigned to such topic. Other manners for determining relevance are also contemplated. The methodology 700 then completes at 714.

Now referring to FIG. 8, an exemplary methodology 800 for clustering emails is illustrated. The methodology 800 begins at 802, and at 804 emails that are desirably clustered are represented using tf-idf (term frequency—inverse document frequency) vectors of selected words. For instance, the selected words can be particular noun phrases within a subject line of an email. At 806, email similarity is measured. For instance, this similarity value can be measured using a cosine distance measure. At 808, agglomerative clustering is performed on a small sample of the available emails, wherein such clustering can be employed to initialize the clusters. At 810, K-means, utilizing the initializations provided through agglomerative clustering, can be run on each email. At 812, Probabilistic Latent Semantic Analysis can be run on all emails utilizing the K-means clusters as initial clusters. The methodology 800 then completes at 814.

Turning now to FIG. 9, a methodology 900 for assigning a document to a topic is illustrated. The methodology 900 starts at 902, and at 904 a document is received that is not assigned to a topic. For example, the document can be a newly created document and/or a newly received document, such as an email that arrives in an inbox. At 906, the document is analyzed with respect to available topics. For example, text associated with the document can be analyzed in light of key phrases that characterize the topic. At 908, a probability that the document should be associated with at least one of the topics is calculated. For example, the received document can be represented utilizing tf-idf vectors of particular words in the document, and such vectors can be compared with the key phrases of several topics. Similarly, a word diagram can be generated for the received document and compared with key phrases associated with a topic. Based upon such comparison, a probability that the document should be associated with a particular topic can be generated. At 910, the document is assigned to at least one topic based at least in part upon the calculated probability. For example, if the probability is above a pre-defined threshold with respect to a topic, the document can be associated with such topic. Furthermore, it is understood that the received document can be assigned to multiple topics. The methodology 900 then completes at 912.

Turning now to FIG. 10, a screenshot 1000 of an exemplary user interface 1002 that can display topics and documents associated with such topics is illustrated. The user interface 1002 can include a topics field 1004 that displays a plurality of topics that are characterized by extracted key phrases from clustered emails. A document display field 1006 can display documents that are associated with a topic selected in the topics field 1004 and information associated with such documents. For example, the document display field 1006 can display a graphical icon that represents a type or status of a document displayed within the document display field 1006. Furthermore, authors or owners of documents can be displayed within the document display field 1006, as well as titles of documents, dates and times of creation and/or receipt of documents displayed within the document display field, a graphical or numerical indication of relevance to the selected topic with respect to each document within the document display field 1006, and any other suitable information. The documents within the document display field 1006 can be arranged according to author, title, date of creation or receipt, relevance, or any other suitable manner of organization. Further, through selection of depressible graphical buttons or other interface, a user can alter how documents are displayed in the document display field. The user interface 1002 further includes a document content field 1008 that can display content or a summary of a document that is selected in the document display field 1006. For instance, if an email is selected in the document display field 1006, content of such email can be presented in the document content field 1016.

Figure 11:
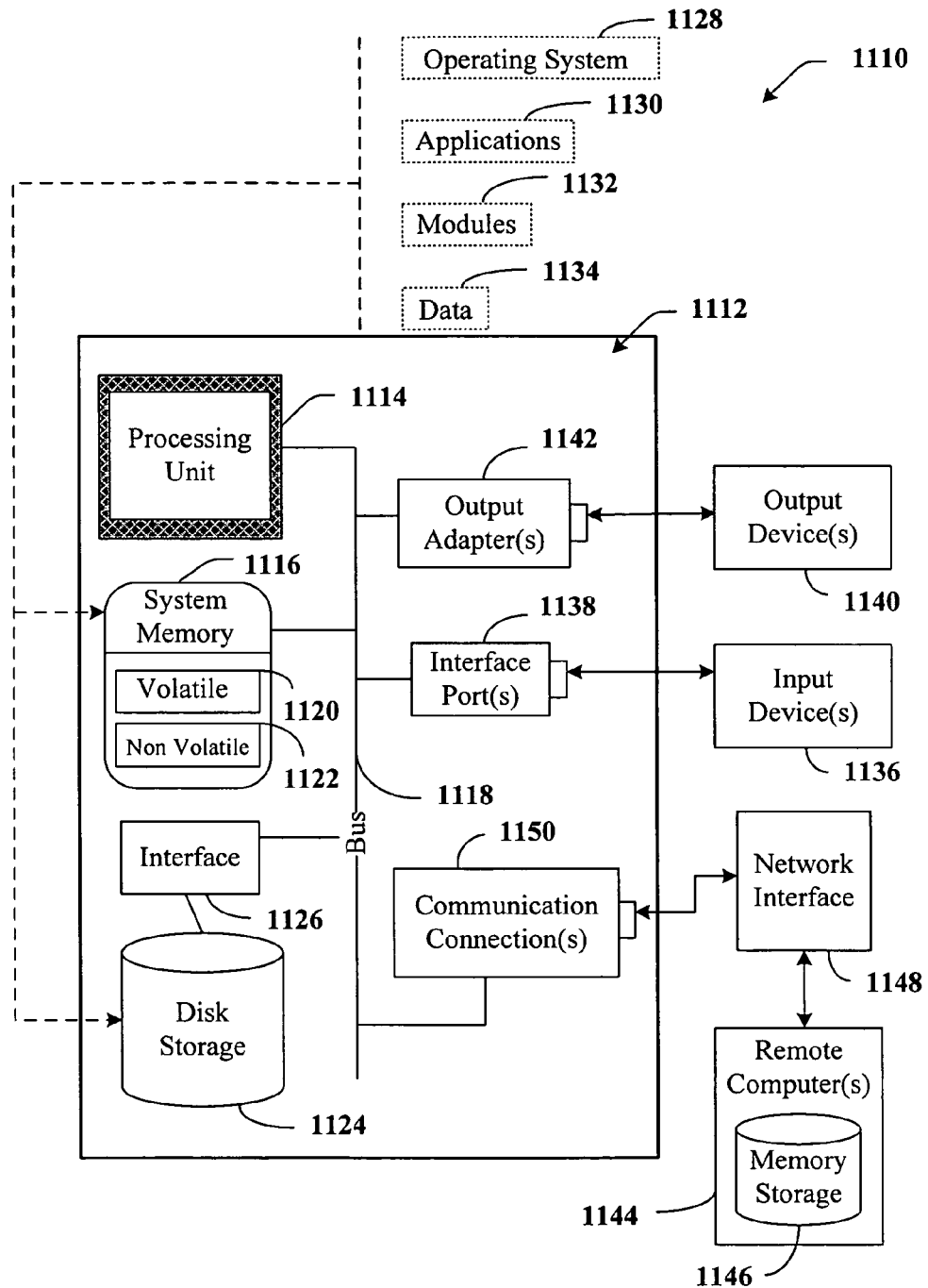
FIG. 11 is a schematic block diagram illustrating a suitable operating environment.

In order to provide additional context for various aspects of the subject invention, FIG. 11 and the following discussion are intended to provide a brief, general description of a suitable operating environment 1110 in which various aspects of the claimed subject matter may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the features described herein. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 that can be employed in connection with automatically organizing one or more documents automatically and without user input includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, remote control, and the like. As described above, advertisements can be provided to a user upon receipt of user input. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
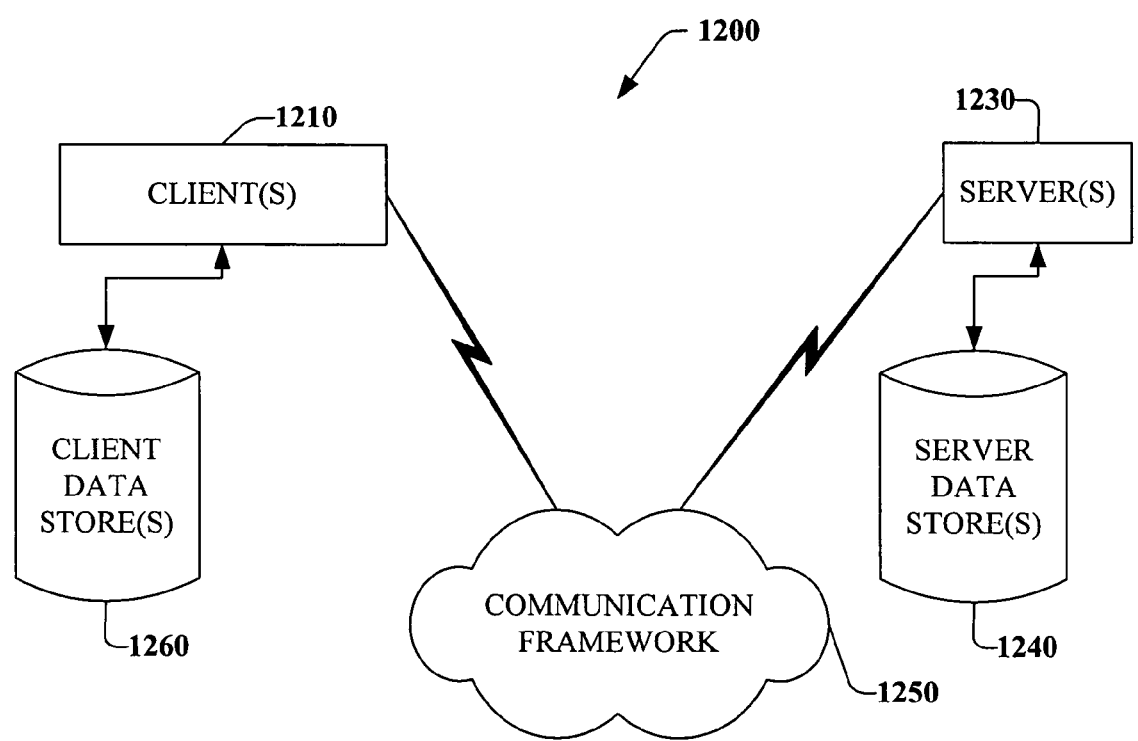
FIG. 12 is a schematic block diagram of a sample-computing environment.

FIG. 12 is a schematic block diagram of a sample-computing environment 1200 with which the claimed subject matter can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the claimed subject matter, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the server(s) 1230. In one particular example, the server(s) can include one or more emails that are accessible by an email application upon the client(s) 1210. Such emails can be retrieved and clustered in connection with characterizing topics.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   computer-readable storage media having processor-executable instructions embodied therein; and
   a processor operatively coupled to the computer-readable storage media to execute the processor-executable instructions for implementing computer-executable components comprising:
   a clustering component that receives and clusters a plurality of emails, the clustering component automatically determining and creating topics for the emails by assigning key phrases extracted from the emails within one or more clusters, the topics being cohesive concepts relevant to a user associated with the emails;
   an organization component that utilizes the topics created from the emails to organize the emails and to also organize other documents of the user within a graphical user interface, the other documents having been stored in a data store separately from the emails and comprising at least one of word processing documents, spreadsheets, presentation files, video files, audio files or digital images; and
   an interface component that displays the topics defined by the clustering component and information pertaining to the organized emails and the other documents associated with the topics.

2. The system of claim 1, the organization component organizing the other documents by comparing content of each other document with the key phrases extracted from the one or more clusters for associating each other document with one or more of the topics.

3. The system of claim 1, further comprising a filtering component that removes a cluster defined by the clustering component if a number of emails within the cluster is below a predefined threshold.

4. The system of claim 1, the organization component comprises a probability component that determines a probability that a document belongs to a certain topic and assigns the document to the certain topic.

5. The system of claim 4, the clustering component employs Probabilistic Latent Semantic Analysis to automatically characterize each topic by a distribution of words within clusters.

6. The system of claim 4, the probability component determines a probability that a word belongs to a certain topic.

7. The system of claim 1, further comprising a key phrase extraction component that characterizes the topic by selecting descriptive keywords from a cluster and labeling the cluster with such descriptive keywords.

8. The system of claim 1,
wherein the plurality of emails comprise a first plurality of emails stored in a first storage device in association with a web-based email account, and a second plurality of emails stored in a second storage device associated with an email application installed on a computer including the processor,
wherein the clustering component receives both the first plurality of emails and the second plurality of emails for clustering.

9. The system of claim 1, further comprising:
an analysis component that reviews text in subject lines of the emails and creates a list of noun phrases;
a supplement component that supplements the noun phrases with a set of words that appear in the noun phrases; and
a counting component that counts a number of occurrences of the supplemented noun phrases in a body of an email.

10. The system of claim 1, further comprising a token component that supplies tokens to each email within the plurality of emails corresponding to deliverers of the emails and recipients of the emails, the tokens employed by the clustering component to refine a topic and to separate topics that are lexically similar.

11. The system of claim 1, the interface component automatically arranges the topics defined by the clustering component and presents such arrangement to a user.

12. The system of claim 11, the interface component comprises a relevance calculator component that calculates a relevance measure of an email with respect to a topic that includes the email, documents within a topic can be arranged within the graphical user interface based at least in part upon the calculated relevance measure.

13. The system of claim 1, further comprising an assignment component that assigns an incoming email to at least one topic based upon a calculated probability of relevance to the topic.

14. A method comprising:
employing a processor executing computer executable instructions stored on a computer-readable storage medium to implement the following acts:
receiving a plurality of emails;
clustering the plurality of emails into multiple clusters;
performing key phrase extraction upon emails within at least one of the clusters;
characterizing a topic with one or more extracted key phrases, the topic being a cohesive concept that is relevant to a user associated with the plurality of emails, the topic being at least one of: an activity in which the user participates, an event the user organized or attended, a person or group of people within an organization to which the user belongs, or a project; and
automatically organizing non-email documents of the user stored in a first data store and the plurality of emails based upon the topics characterized with the one or more extracted key phrases from the emails, the non-email documents stored in the data store being organized by comparing content of each non-email document with the key phrases extracted from the multiple clusters of the plurality of emails for associating each non-email document with one or more of the topics, the non-email documents comprising at least one of: word processing documents, spreadsheets, presentation files, video files, audio files or digital images.

15. The method of claim 14, further comprising supplying tokens to each email within the plurality of emails corresponding to deliverers of the emails and recipients of the emails, the tokens employed to refine a topic and to separate topics that are lexically similar.

16. The method of claim 15, the act of clustering further comprises:
representing the plurality of emails using term frequency-inverse document frequency (tf-idf) vectors of selected words;
employing a cosine distance measure to measure email similarity;
creating cluster initializations by performing agglomerative clustering on a subset of the plurality of emails based on the measure of email similarity; and
running K-means using the cluster initializations on each of the plurality of emails.

17. The method of claim 14,
wherein receiving the plurality of emails comprises receiving a first plurality of emails stored in a first data store, wherein the first plurality of emails are associated with an email application installed on a computer including the processor,
wherein receiving the plurality of emails further comprises receiving a second plurality of emails stored in a second data store in association with a web-based email account,
wherein both the first plurality of emails and the second plurality of emails are clustered during the clustering.

18. The method of claim 14, further comprising:
displaying a list of expandable topics upon a graphical user interface, the topics correlate to labeled clusters; and
displaying emails associated with the expandable topics upon selection of at least one of the expandable topics.

19. A computer-implemented method comprising:
employing at least one processor that executes computer executable code stored in computer-readable storage media to effect the following:
receiving a first plurality of emails stored in a first storage device in association with a web-based email account;
receiving a second plurality of emails stored in a second storage device associated with an email application installed on a computer including the processor;
clustering the first and second plurality of emails, the clustering employing multistage clustering that runs a first cluster technique on the first and second plurality of emails to form one or more clusters, and then runs a second cluster technique on the one or more clusters initialized from the first technique, the second cluster technique being different from the first cluster technique and further refining the one or more clusters so as to facilitate key phrase extraction from emails within the one or more clusters;

extracting key phrases from the emails within the one or more clusters and labeling each of the one or more clusters with a subset of the extracted key phrases for establishing a topic for each of the one or more clusters;

performing post processing on the topics to remove certain key phrases associated with the topics based on a determination that the certain key phrases occur in multiple emails and are not representative of a topic;

organizing non-email documents and the emails within a graphical user interface based upon the topics generated from the clustered emails, the non-email documents being organized by comparing content of each non-email document with the key phrases extracted from the multiple clusters of the plurality of emails for associating each non-email document with one or more of the topics, the non-email documents comprising at least one of: word processing documents, spreadsheets, presentation files, video files, audio files or digital images; and rendering information related to the organized non-email documents and emails.

20. The method according to claim 19 further comprising:

running K-means clustering as the first cluster technique to create one or more clusters; and running latent semantic analysis as the second cluster technique that further refines the one or more clusters to facilitate key phrase extraction from emails within the one or more clusters.

\* \* \* \* \*

UNITED STATES PATENT AND TRADEMARK OFFICE
CERTIFICATE OF CORRECTION

PATENT NO. : 7,765,212 B2
APPLICATION NO. : 11/321963
DATED : July 27, 2010
INVENTOR(S) : Arungunram C. Surendran et al.

It is certified that error appears in the above-identified patent and that said Letters Patent is hereby corrected as shown below:

In column 16, line 5, in Claim 14, after "in a" delete "first".

In column 17, line 1, in Claim 19, after "clusters" delete "so as".

Signed and Sealed this
Third Day of May, 2011

David J. Kappos
*Director of the United States Patent and Trademark Office*